United States Patent [19]

Matsubara et al.

[11] Patent Number: 4,929,680

[45] Date of Patent: May 29, 1990

[54] PREPARATION METHOD OF MASTERBATCH COMPOSITION FOR THERMOPLASTIC RESIN MODIFICATION

[75] Inventors: Saburo Matsubara; Yoshihiro Gohshi; Seizo Kobayashi; Katsumi Usui, all of Yokohama, Japan

[73] Assignee: Nippon Oil Co., Ltd., Tokyo, Japan

[21] Appl. No.: 373,009

[22] Filed: Jun. 29, 1989

[30] Foreign Application Priority Data

Jun. 30, 1988 [JP] Japan ................. 63-160706

[51] Int. Cl.$^5$ ................. C08L 23/18; C08L 23/08
[52] U.S. Cl. ................. 525/240; 264/143; 524/490
[58] Field of Search ................. 525/240; 264/143, 141; 524/490

[56] References Cited

U.S. PATENT DOCUMENTS

| | | | |
|---|---|---|---|
| 3,455,871 | 7/1969 | Coover et al. | 525/240 |
| 4,337,188 | 6/1982 | Climenhage et al. | 524/140 |
| 4,542,188 | 7/1985 | van de Heijden | 525/240 |
| 4,657,982 | 4/1987 | Brecke et al. | 525/240 |
| 4,803,035 | 2/1989 | Kresge et al. | 264/143 |

FOREIGN PATENT DOCUMENTS

011930 6/1980 European Pat. Off. .

*Primary Examiner*—Carman J. Seccuro
*Attorney, Agent, or Firm*—Millen, White & Zelano

[57] ABSTRACT

A method for the preparation of masterbatch compositions for use in thermoplastic resin modification by blending polybutene with an ethylene.α-olefin copolymer which is obtained by copolymerizing ethylene and α-olefin in the presence of specific catalysts and has specific characteristics such as a density of exceeding 0.910 g/cm$^3$ and 0.940 g/cm$^3$ or less, and successively by kneading and extruding the blend in the temperature range from the maximum peak temperature (Tm) to (Tm-45° C.) in accordance with differential scanning calorimetry (DSC).

10 Claims, No Drawings

PREPARATION METHOD OF MASTERBATCH COMPOSITION FOR THERMOPLASTIC RESIN MODIFICATION

BACKGROUND OF THE INVENTION a. Field of the Invention:

The present invention relates to a method for the preparation of a masterbatch composition being used for thermoplastic resin modification and having low tackiness and good workability.

More particularly, it relates to a method for the preparation of a masterbatch composition comprising polybutene and an ethylene-α-olefin copolymer obtained by copolymerizing ethylene with an α-olefin and having specific characteristics.

b. Description of the Prior Art:

A variety of molded articles, sheets and films are prepared from thermoplastic resins by molding processes such as injection molding, extrusion molding, blow molding and inflation molding. The thermoplastic resins are generally blended with various kinds of liquid, solid or powdery modifiers, for example, plasticizers, fillers, dyestuffs, pigments, lubricants, antioxidants and other agents in order to provide the resins with characteristics required for each application. These modifiers are blended with the thermoplastic resins in advance, pelletized and used. Alternatively, masterbatch pellets having a higher content of the modifiers are previously prepared and used for molding after dry blending with the base resin. Particularly in case of liquid modifiers, masterbatch pellets are generally prepared in advance and used after dry blending with the thermoplastic resins.

In case polybutene is used for the above modifiers, masterbatch pellets having a higher polybutene content must be prepared. Polybutene, however, causes the problems described below, because polybutene is poorly compatible with other polyolefin resins. Directly or several days after preparation, tackiness of the resulting pellets increases due to breeding of polybutene on the surface of the pellets.

Consequently, blocking of the pellets takes place with each other or bridging of the pellets occurs in a hopper in the dry blending operation. Accordingly, the prescribed amount of polybutene cannot be blended or ununiformity of the blended mixture is resulted even through blending procedures are performed. Thus blending operation becomes extremely difficult.

SUMMARY OF THE INVENTION

An object of this invention is to provide a method for the preparation of a composition being used as masterbatch pellets for thermoplastic resin modification, having low tackiness of surface, and hence leading to decreased blocking of the pellets with each other, attaining uniform dispersion in dry blending operation and being capable of feeding the pellets at a constant rate as a result of preventing bridging of the pellets in a hopper.

Another object of this invention is to provide a method for the preparation of a masterbatch composition being used for thermoplastic resin modification, being capable of increasing the content of polybutene as a modifier and hence being capable of enhancing efficiency of the masterbatch.

A further object of this invention is to provide a method for the preparation of a masterbatch composition being used for thermoplastic resin modification, being pelletized at reduced temperatures and hence being readily molded and capable of inhibiting thermal deterioration of the pellets in molding operation.

A still further object of this invention is to provide a method for the preparation of a masterbatch composition being used for thermoplastic resin modification and having excellent moldability such as ease of pelletizing after cooling strands with water.

The above objects of this invention can be achieved by providing a method for the preparation of a masterbatch composition for use in thermoplastic resin modification which comprises kneading and extruding a component mixture in the temperature range from the maximum peak temperature (Tm) to (Tm-45)° C in accordance with differential scanning calorimetry (DSC) of an ethylene-α-olefin copolymer, the component mixture comprising:

(A) 30–95 parts by weight of the ethylene-α-olefin copolymer obtained by copolymerizing ethylene with an α-olefin having 3-12 carbon atoms in the presence of a catalyst composed of an organic aluminum compound and a solid component containing at least magnesium and titanium, and characterized by the properties (I)–(IV):

(I) Melt index of from 0.01 to 100 g/10 min,
   (II) Density of more than 0.910 g/cm$^3$ and 0.940 g/cm$^3$ or less,
   (III) Maximum peak temperature (Tm) of 100° C or more in accordance with differential scanning calorimetry (DSC), and
   (IV) Boiling n-hexane insoluble matter of 10 wt% or more; and (B) 5–70 parts by weight of polybutene having a number average molecular weight of 300–4000.

DESCRIPTION OF THE PREFERRED EMBODIMENTS

The present invention will be described in detail hereinafter.

Ethylene-α-olefin Copolymer (A):

The ethylene-α-olefin copolymer for use in this invention can be prepared by conducting copolymerization of ethylene and α-olefin in the presence of a catalyst consisting of an organic aluminum compound and a solid ingredient containing at least magnesium and titanium. An α-olefin containing 3–12 carbon atoms can be used for the method of this invention. Exemplary suitable α-olefin compounds include propylene, butene-1, 4-methylpentene-1, hexene-1, octene-1, decene-1 and dodecene-1. Among these compounds, particularly preferred are those having 3–6 carbon atoms such as propylene, butene-1, 4-methylpentene-1 and hexene-1. Dienes such as butadiene and 1,4-hexadiene can also be used in combination with α-olefins as comonomers for the polymerization within the scope of this invention. α-Olefin content of the ethylene-α-olefin copolymer is preferably 2–10 mol%.

The catalyst system for use in the method of this invention is a combination of the organic aluminum compound with the solid catalyst component containing at least magnesium and titanium.

Suitable solid catalyst component is obtained by supporting the titanium compound with a known process on an inorganic solid compound containing magnesium. Exemplary suitable inorganic solid compound containing magnesium includes magnesium metal; magnesium hydroxide; magnesium oxide; magnesium salts such as magnesium carbonate and magnesium chloride; double salts, double oxides, carbonates, chlorides or hydroxides containing magnesium atoms and metals selected from silicon, aluminum and calcium; and other compounds obtained by treating or reacting these inorganic sold compounds with oxygen containing compounds, sulfur containing compounds, aromatic hydrocarbons or halogen containing substances.

The above oxygen containing compounds include, for example, water; oxygen containing organic compounds such as alcohol, phenol, ketone, aldehyde, carboxylic acid, ester, alkoxy silane, polysiloxane and acid amide; and oxygen containing inorganic compounds such as metal alkoxide and metal oxychloride.

Exemplary sulfur containing compounds include sulfur containing organic compounds such as thiol and thioether, and inorganic sulfur compounds such as sulfur dioxide, sulfur trioxide and sulfur. Exemplary suitable aromatic compounds include various mono- and poly-aromatic hydrocarbon compounds such as benzene, toluene, xylene, anthracene and phenanthrene. Halogen containing compounds suitable for use include, for example, compounds such as chlorine, hydrogen chloride, metal chlorides and organic halides.

On the other hand, suitable titanium compound which is supported on the inorganic solid compound containing magnesium includes, for example, titanium halide, titanium alkoxy halide, titanium alkoxide and titanium oxy halide. Tetravalent and trivalent titanium compounds are preferably used in particular. The tetravalent titanium compound is preferably represented by the formula, $Ti(OR)_nX_{4-n}$, wherein R is an alkyl, aryl or aralkyl group of 1–20 carbon atoms and n is an integer indicated by the range of $0 \leq n \leq 4$.

Exemplary tetravalent titanium compound suitable for use includes titanium tetrachloride, titanium tetrabromide, titanium tetraiodide, monomethoxy(trichloro)titanium, dimethoxy(dichloro)titanium, trimethoxy(monochloro)titanium, tetramethoxytitanium, monoethoxy(trichloro)titanium, diethoxy(dichloro)titanium, triethoxy(monochloro)titanium, tetraethoxytitanium, monoiosporpoxy(trichloro)titanium, diisopropoxy(dichloro)titanium, triisopropoxy(monochloro)titanium, tetraisopropoxytitanium, monobutoxy(trichloro)titanium, dibutoxy(dichloro)titanium, monopentoxy(trichloro)titanium, monophenoxy(trichloro)titanium, diphenoxy(dichloro)titanium, triphenoxy(monochloro)titanium and tetraphenoxytitanium.

Titanium trihalides such as titanium trichloride are preferably used among trivalent titanium compounds.

Among these titanium compounds, tetravalent titanium compounds are preferable and titanium tetrachloride is preferred in particular.

As an example of other catalyst systems, a catalyst system can be illustrated which is prepared by using, as a catalyst component, a reaction product of the titanium compound and organic magnesium compounds such as so-called Grignard reagent and by combining the reaction product with the organic aluminum compound.

The organic magnesium compounds are represented, for example, by the formulas such as $RMgX$, $R_2Mg$ and $RMg(OR)$ wherein R is an organic group having 1–20 carbon atoms and X is a halogen atom. Other useful substances are ether complexes of these magnesium compounds and compounds obtained by further modifying these organic magnesium compounds with admixture of various types of organic metal compounds such as organic sodium compounds, organic lithium compounds, organic potassium compounds, organic boron compounds, organic calcium compounds and organic zinc compounds.

As to another example of other catalyst systems, a system can also be illustrated which is prepared by contacting inorganic oxides such as $SiO_2$ and $Al_2O_3$ with the above solid catalyst component containing at least magnesium and titanium, and using the resulting solid substance for the solid catalyst component to be combined with the organic aluminum compound. Inorganic oxides include, for example, CaO, $B_2O_3$ and $SnO_2$ in addition to $SiO_2$ and $Al_2O_3$. Double oxides of these compounds can also be employed without any trouble.

Known methods can be applied to contact these inorganic oxides with the solid catalyst component containing magnesium and titanium. For example, the oxides may be reacted with the solid catalyst component at a temperature of 20–400° C, preferably at a temperature of 50°14 300° C, usually for 5 minutes to 20 hours in the presence or absence of an inert solvent. Alternatively, the oxides and the solid catalyst component may be subjected to a co-grinding treatment. A suitable combination of bath procedures may also be employed for carrying out the reaction.

In these catalyst systems, the titanium compound may also be used for the reaction after converting the compound to an adduct of an organic carboxylic acid ester. The above inorganic solid compound containing magnesium may also be employed after bringing into contact with the organic carboxylic acid ester. The organic aluminum compound may also be used in the form of an adduct with the organic carboxylic acid ester or an organic silicon compound.

Exemplary suitable organic aluminum compound to be combined with the above solid catalyst component is represented by the formulas, $R_3Al$, $R_2AlX$, $RAlX_2$, $R_2AlOR$, $RAl(OR)X$ and $R_3Al_2X_3$, wherein R is an alkyl, aryl or aralkyl group having 1–20 carbon atoms, X is a halogen atom and R may be the same or different. The examples of the organic aluminum compound include triethylaluminum, triisobutylaluminum, trihexylaluminum, trioctylaluminum, diethylaluminum chloride, diethylaluminum ethoxide, ethylaluminum sesquichloride and mixtures of these compounds.

No particular limitation is imposed upon the amount of the organic aluminum compound. The compound is usually employed in an amount ranging from 0.1 to 1000 moles per mole of the titanium compound.

In case the above catalyst systems are contacted with the α-olefin before polymerization, the activity of the polymerization sharply improves, with the result that the operation is more stable as compared with the case of non-contacting.

The polymerization reaction is carried out by the same procedures as in the polymerization reaction of olefin in the presence of a usual Ziegler type catalyst. For example, the reaction is conducted substantially in the absence of oxygen and water, and in the vapor phase or in the presence of an inert solvent or by using the monomer itself as the solvent. The reaction is preferably carried out in the vapor phase or in the presence of the inert solvent.

Polymerization of olefin is carried out at a temperature of 20°–300° C, preferably at 40°–200° C and in the pressure range from atmospheric pressure to 7 kgf/cm² preferably from 2 kgf/cm² to 60 kgf/cm². Molecular weight of polymer can be controlled to some extent by changing polymerization conditions such as polymerization temperature and mole ratio of the catalyst. The molecular weight, however, is more effectively adjusted by the addition of hydrogen to the polymerization system. Two-step or multi-steps polymerization reactions under different polymerization conditions such as hydrogen concentration and polymerization concentration can of course be carried out without any trouble.

The ethylene·α-olefin copolymer (A) of this invention having specific properties is prepared by the above methods.

The ethylene·α-olefin copolymer used in this invention has a melt index (MI) of 0.01–100 g/10 min, preferably 0.1–50 g/10 min and more preferably 0.1–20 g/10 min. The melt index is measured at 190° C under 2.16 kg load in accordance with JIS K-6760.

Density of the copolymer is more than 0.910 g/cm$^3$ and 0.940 g/cm$^3$ or less, preferably in the range of 0.915–0.940 g/cm$^3$ and more preferably in the range of 0.915–0.935 g/cm$^3$ in accordance with JIS K-6760.

The maximum peak temperature (Tm) of the copolymer by differential scanning calorimetry (DSC) is 100° C or more preferably in the range of 110°–130° C, and more preferably in the range of 115°–125° C.

The content of boiling n-hexane insoluble matter in the copolymer is 10 wt% or more, preferably in the range of 20–95 wt% and more preferably in the range of 20–90 wt%

When MI of the ethylene·α-olefin copolymer (A) is less than 0.01 g/10 min, flowability of the copolymer becomes poor due to too much reduction of MI. On the other hand, when MI exceeds 100 g/10 min, the masterbatch composition become too soft and thus lead to surface tackiness.

When the density is 0.910 g/cm$^3$ or less, moldability of the composition becomes poor. When the density exceeds 0.945 mg/cm$^3$, extrusion molding of strands becomes difficult. Even though the strands can be molded by extrusion, the resulting composition become unstable and bleeding occurs during storage for a long period of time.

When the maximum peak temperature of DSC is less than 100° C, tackiness generates on the surface of masterbatch.

When the content of boiling n-hexane insoluble matter is less than 10 wt%, surface tackiness also unfavorably occurs on the surface of masterbatch composition.

The ethylene·α-olefin copolymer is preferably used in the form of powder or granule for preparing the composition of this invention.

Polybutene (B):

Polybutene (B) for use in this invention can be selected from a wide range of products depending upon its application. Polybutene (B) includes, for example, viscous polymers which are commonly produced in the industry by removing butadiene from C$_4$-fraction in naphtha cracking and by polymerizing the resultant butane-butene fraction in the presence of acidic catalysts such as aluminum chloride, silica-alumina, cation exchange resin, and particularly Friedel-Crafts catalysts.

The polybutene for use in this invention generally has a number average molecular weight of 300–4000 and preferably 400–3000. When the number average molecular weight is lower than this range, polybutene exhibits unfavorably low flask point and tends to partly evaporate during storage for a long period of time. When the number average molecular weight is higher than this range, polybutene becomes difficult to handle because of too high viscosity.

Component Proportion:

In the masterbatch composition for thermoplastic resin modification, proportion of ethylene·α-olefin copolymer (A) is 30–95 parts by weight, preferably 40–90 parts by weight and more preferably 45–90 parts by weight. The proportion of polybutene (B) is 5–70 parts by weight, preferably 10–60 parts by weight and more preferably 10–55 parts by weight.

When the content of polybutene in the masterbatch is lower than 5 parts by weight, too much amount of the masterbatch is required and hence efficiency is decreased. When the content of polybutene exceeds 70 parts by weight, unfavorable tackiness generates on the surface of resultant masterbatch composition.

Preparation of the Masterbatch Composition for Thermoplastic Resin Modification:

In the preparation method of this invention, the masterbatch composition for thermoplastic resin modification can be prepared by uniformly kneading the above ethylene·α-olefin copolymer and polybutene so that prescribed proportion of the component and extruding. The masterbatch composition usually shapes into pellets. Suitable known technology can be used for conducting the process. Representative examples of the technology include a kneading and extrusion process using a single screw extruder or twin screw extruder. The kneading and extruding temperatures in the process are generally in the range from the maximum peak temperature Tm °C to the temperature (Tm-45)° C by DSC of the above ethylene·α-olefin copolymer. Preferred temperature range in the process is from less than Tm °C to (Tm-40)° C. More preferred temperature range is from (Tm-5)° C to (Tm-40)° C. Particularly preferred temperature range is from (Tm-10)° C to (Tm-30)° C.

When the kneading and extruding temperatures are higher than Tm °C, bleeding occurs on the surface of resulting composition and tackiness of the composition also increases unfavorably. On the other hand, when the kneading and extruding temperatures are lower than (Tm-45)° C, strength of the composition themselves lowers or strands cannot be extruded and hence pelletizing becomes difficult. The ethylene·α-olefin copolymer and polybutene may be mechanically mixed prior to to kneading. Alternatively, they may be simultaneously or separately charged into the kneader.

The composition prepared by the method of this invention is usually employed after pelletizing. The pelletizing step can also be conducted by suitable known technology. Representative examples of the technology include cold-cut process and hot-cut process. In the cold-cut process, the resin strands extruded under the above processing conditions are cooled in the water or by the air and successively cut into pellets with a pelletizer.

Conventionally known additives such as plasticizers, fillers, dyestuffs, pigments, lubricants and antioxidants may be added to the composition of this invention. In addition, tackifying resins such as aliphatic and aromatic petroleum resins, aliphatic petroleum resins, terpen resins, rosin and its derivatives can be previously blended into the composition.

The masterbatch composition for thermoplastic resin modification obtained by the method of this invention has excellent characteristics as described above and hence can be used for wide fields of application. The application includes thermoplastic resin modifiers used in various fields such as, for example:

(a) Various packaging films (wrapping films, stretch films, agricultural films),
(b) Various kinds of sheets,
(c) Covering materials,
(d) Noise insulating materials, damping materials, sealants, waterproof materials,
(e) Foot gears, and
(f) Hoses, packings.

No particular restriction is put on the above thermoplastic resins. Exemplary thermoplastic resins include polyethylene, polypropylene, polystyrene, synthetic rubbers, polyvinyl acetate, polyvinyl alcohol, polyvinyl acetal, polyacrylates, polyacrylic acid derivatives, polyacrylamide, polyethers, polyvinyl chloride, polyvinylidene chloride, polyacrylonitrile, polyfluoroethylene, polyester, polycarbonate, cellulose resins, polyamides, polyimides, polyamideimides and polysulfones.

EXAMPLE

This invention will hereinafter be illustrated in detail by way of examples. However, this invention is not limited to the specific embodiments.

Methods for Measuring Physical Properties:
Differential scanning calorimetry (DSC)

A film having a thickness of 100 —m was molded by a hot press and used for the sample. The sample was heated to 170° C, maintained at the temperature for 15 minutes and cooled to 0° C at a cooling rate of 25° C/min. Measurement was started at this state and the sample is heated to 170° C at a rate of 10° C/min. The maximum peak was selected from the peaks generated during the temperature rise from 0° C to 170° C. The position of top of the maximum peak was defined as the maximum peak temperature (Tm). Measurement of boiling n-hexane insoluble matter A sheet having a thickness of 200 μm was molded by a hot press and respectively 3 sheets having dimensions of 200×300 mm were cut out of the molded sheet and used for specimens. The specimens were extracted with boiling n-hexane for 5 hours by using a double pipe Soxhlet extractor. The residue obtained was dried under vacuum at 50° C for 7 hours and the content of boiling n-hexane insoluble matter ($C_6$ insoluble matter) was calculated from the following equation.

Boiling n-hexane insoluble matter (wt. %) =

$$\frac{\text{weight of sheet after extraction}}{\text{weight of sheet before extraction}} \times 100 \text{ (wt. \%)}$$

Tackiness of pellets

A strand having a length of about 50 mm was used for the specimen. The specimen is inserted between 2 sheets of transparent polyester film having a thickness of 38 μm and lightly pressed with fingers. Marks of the strand remained on the polyester film were evaluated by visual observation and divided into the following classes.

◎: No tackiness (no mark remained at all)

○ : Almost no tackiness (light marks remained)
Δ: Tackiness was somewhat present (marks remained to some extent)
X : Tackiness was present (marks completely remained)

Moldability of pellets

After cooling the extruded strands with water, stability of the strands were evaluated in the step of cutting into pellets with a pelletizer and divided into the following classes.

◎ : Stable strand cutting was conducted.
○: Relatively stable strand cutting was conducted.
Δ: Strands had coarse surface and sometimes caused breakage.
X : Pelletizing was difficult.

Preparation of Ethylene-α-olefin Copolymer Sample:

Ethylene-α-olefin copolymer components which were used in examples and comparative examples [Components (A-1), (A-2), (A-3) and (A-4)]will be described below.

Preparation of components (A-1) and (A-2)

Ethylene-butene-1 copolymers (A-1) and (A-2) were prepared by copolymerizing ethylene with butene-1 in the presence of a catalyst consisting of triethylaluminum and a solid catalyst component derived from substantially anhydrous magnesium chloride, 1,2-dichloroethane and titanium tetrachloride.

Preparation of component (A-3) and (A-4)

Ethylene-propylene copolymers (A-3) and (A-4) were prepared by copolymerizing ethylene with propylene in the presence of a catalyst consisting of triethylaluminum and a solid catalyst component derived from substantially anhydrous magnesium chloride, anthracene and titanium tetrachloride.

Properties of these ethylene-α-olefin copolymer components are illustrated in Table 1.

Examples 1–6

Ethylene-α-olefin copolymer granules and polybutene (Trade Mark; Nisseki Polybutene, Product of Nippon Petrochemical Co., Ltd.) which was previously warmed to 80° C were separately fed by pumps from hoppers to a single screw extruder so as to obtain compositions illustrated in Table 2. The extruder had a screw diameter of 20 mm, L/D ratio of 20, and die diameter of 2 mm, and was preheated to the extrusion temperature illustrated in Table 2. Kneading and extrusion were carried out at a revolution of 70 rpm to obtain strands. The strands thus obtained were then cooled with water and cut into pellets with a pelletizer.

In all cases of Examples 1–6, strands could be continuously extruded and pelletized with the pelletizer without any trouble. The resultant pellets had an extremely low tackiness. Results on the evaluation of properties in these examples are summarized in Table 2.

Comparative Example 1

The same procedures as described in Example 1 were carried out except that the extrusion temperature of 160° C was used. The resultant pellets were very tacky and thus adhered to each other to form blocks.

Comparative Example 2

The component mixture of Example 1 was tried to pelletize by carrying out the same procedures as described in Example 1 except that the extrusion temperature of 70° C was used. However, extruded mass was broken to pieces and continuous strands could not be obtained.

Comparative Examples 3-4

The component mixtures were tried to pelletize by repeating the same procedures as described in Example 1 except that commercially obtained high density polyethylene (HDPE) [Trade Mark; Nisseki Staflene E-807(F), product of Nippon Petrochemical Co. Ltd., Tm = 129° C]was used in place of ethylene·α-olefin copolymer grains. However, extruded mass was broken to pieces and continuous strands could not be obtained.

TABLE 1

| Component | Melt Flow Rate (g/10 min) | Density (g/cm$^3$) | DSC max. peak (Tm) (°C.) | Boiling n-hexane insoluble matter (wt %) | Ethylene content in polymer (mole %) |
|---|---|---|---|---|---|
| A-1 | 1.1 | 0.920 | 122.5 | 96.3 | 96.2 |
| A-2 | 0.9 | 0.925 | 123.3 | 97.5 | 97.3 |
| A-3 | 0.5 | 0.915 | 121.8 | 92.0 | 94.1 |
| A-4 | 1.6 | 0.928 | 124.3 | 98.6 | 97.6 |

TABLE 2

| Example or Comparative Example | Component A | Polybutene (Number average mol. wt.) | Tm (°C.) | Extrusion temperature (°C.) | Evaluation of pellet tackiness Polybutene content (wt %) | | | | Moldability |
|---|---|---|---|---|---|---|---|---|---|
| | | | | | 10 | 20 | 30 | 50 | 30 |
| Ex.-1 | A-1 | 970 | 122.5 | 110 | ⊚ | ⊚ | ⊚ | ⊚ | ⊚ |
| Ex.-2 | A- | 750 | 122.5 | 110 | ⊚ | ⊚ | ⊚ | ⊚ | ⊚ |
| Ex.-3 | A-1 | 1,350 | 122.5 | 110 | ⊚ | ⊚ | ⊚ | ⊚ | ⊚ |
| Ex.-4 | A-2 | 970 | 123.3 | 90 | ⊚ | ⊚ | ⊚ | ⊚ | ⊚ |
| Ex.-5 | A-3 | 970 | 121.8 | 90 | ⊚ | ⊚ | ⊚ | ⊚ | ⊚ |
| Ex.-6 | A-4 | 970 | 124.3 | 120 | ⊚ | ⊚ | ⊚ | ⊚ | ⊚ |
| Comp. Ex.-1 | A-1 | 970 | 122.5 | 140 | Δ | Δ | X | X | |
| Comp. Ex.-2 | A-1 | 970 | 122.5 | 70 | Strand extrusion was impossible. | | | | X |
| Comp. Ex.-3 | HDPE | 970 | 129 | 110 | Strand extrusion was impossible. | | | | X |

What is claimed is:

1. A method for the preparation of a masterbatch composition for use in thermoplastic resin modification which comprises kneading and extruding a component mixture in the temperature range from the maximum peak temperature (Tm) to (Tm-45)° C in accordance with differential scanning calorimetry (DSC) of an ethylene·α-olefin copolymer, the component mixture comprising:

(A) 30-95 parts by weight of the ethylene·α-olefin copolymer obtained by copolymerizing ethylene with an α-olefin having 3-12 carbon atoms in the presence of a catalyst composed of an organic aluminum compound and a solid component containing at least magnesium and titanium, and characterized by the properties (I)-(IV):

(I) Melt index of from 0.01 to 100 g/10 min,
    (II) Density of more than 0.910 g/cm$^3$ and 0.940 g/cm$^3$ or less
    (III) Maximum peak temperature (Tm) of 100° C or more in accordance with differential scanning calorimetry (DSC), and
    (IV) Boiling n-hexane insoluble matter of 10 wt % or more; and (B) 5-70 parts by weight of polybutene having a number average molecular weight of 300-4000.

2. The method of claim 1 wherein said α-olefin in the ethylene·α-olefin copolymer (A) has carbon atoms from 3 to 6.

3. The method of claim 1 wherein the content of α-olefin in the ethylene·α-olefin copolymer (A) is from 2 to 10 mol %.

4. The method of claim 1 wherein said ethylene·α-olefin copolymer (A) has a melt index of from 0.1 to 50 g/10 min.

5. The method of claim 1 wherein said ethylene·α-olefin copolymer (A) has a density of from 0.915 to 0.940 g/cm$^3$.

6. The method of claim 1 wherein said ethylene·α-olefin copolymer (A) has a Tm of from 110° to 130° C.

7. The method of claim 1 wherein said ethylene·α-olefin copolymer (A) has a boiling n-hexane insoluble matter of from 20 to 95% by weight.

8. The method of claim 1 wherein said polybutene (B) has a number average molecular weight of from 400 to 3000.

9. The method of claim 1 wherein the component mixture comprising from 40 to 90 parts by weight of said ethylene·α-olefin copolymer (A) and from 10 to 60 parts by weight of said polybutene (B).

10. The method of claim 1 wherein the kneading and extruding are carried out in the temperature range of from less than Tm to (Tm-40)° C.

* * * * *